INVENTOR
ROBERT R. ARONSON

United States Patent Office 3,518,127
Patented June 30, 1970

3,518,127
FLOOR INTERCONNECTING BATTERY CELLS
Robert R. Aronson, Ferndale, Mich., assignor, by mesne assignments, to Electric Fuel Propulsion, Inc., Ferndale, Mich., a corporation of Delaware
Filed Dec. 26, 1967, Ser. No. 693,274
Int. Cl. H01m 35/32
U.S. Cl. 136—134                                                                 13 Claims

ABSTRACT OF THE DISCLOSURE

This invention relates to a storage battery with a plurality of intercellular separated connections within the battery case. Conducting bars, which link all the plates of the same polarity in each cell, may extend through openings in the partitions separating adjacent cells to effect serial intercellular connection. A method of constructing the invention comprises pouring molten lead into troughs cut in or formed on the battery floor to form bars, certain troughs in adjacent cells being joined by an opening through the adjoining partition so that lead moves into the opening. The plates are then set into the molten lead bars, which then harden and serve as intercellular and intracellular connections. A second method comprises attaching bars linking all the plates of the same polarity in each cell to connecting members associated with each partition to effect serial intercellular connection.

DESCRIPTION OF THE PRIOR ART AND SUMMARY OF THE INVENTION

Electrical storage batteries have earned a reputation as rugged, reliable, portable and inexpensive sources of direct current voltage many times over the years. This invention relates to an improvement in storage batteries which will further enhance that excellent reputation.

The patent to Reed, 2,511,943, discloses an improved storage battery wherein all plates of the same polarity in each cell are connected together by at least a single bar which rests on the floor of the battery case. All of the plates of both polarities are fabricated with legs or extensions which are attached to these bars, the positive and negative plates in each cell having these legs located in a different area on the bottom of the plate to facilitate connection of all plates of the same polarity. The battery case is constructed with narrow, upstanding ribs or webs extending upward from the floor so that the bars connecting all the plates of the same polarity in each cell are each disposed within open chambers formed by these ribs, the partitions separating the cells and the battery case. The plate legs themselves are made sufficiently longer than the ribs so that the main body of each plate is held considerably above the ribs. The cells are each separated by a partition from neighboring cells, and the only intercellular connection is the exterior conventional strap near the top of the battery.

One advantage of this arrangement is that the plates of the same polarity in each cell are connected in a number of locations, thus reducing the chance of a battery failure due to plate buckling, or to any plate being shaken loose from some connections by excessive shock or vibration. Also, the multiple electrical connections allow any plate to discharge if that plate is still connected to the other plates in a single location. The separation of the plates above the narrow ribs prevents the wearing of the plates into or by the ribs and, because of the narrow rib width, the oxidized material which inevitably settles from the plates cannot perch on the top of these ribs and short-circuit the plates.

This invention relates to another improvement whereby not only the plates of each polarity in each cell are electrically connected, but the cells themselves are connected in a plurality of locations. In one embodiment the connectors which serve to connect the plates are linked to effect cell interconnection, duplicating the conventional cell connetions on the top of the plates. The improvements of this invention result in marked inreases in reliability, ability to withstand rough handling, and battery capabilities.

One of the battery characteristics which is especially enhanced is the ability of the battery to withstand high current during either charging or discharging. Frequently, batteries fail because a cell interconnecting strap fails during the passage of high current, either because this strap was not welded with the degree of care necessary or because of a structural fault in the strap. This invention, by providing a number of intercellular current paths which divide the current flow through the battery, increases the total current which a given battery can handle while decreasing the current through each individual current path. Should any particular intercellular connection fail, the battery can still operate as long as the current which must be carried does not exceed the abilities of the remaining connections to withstand it. This ability to carry high electrical current both suits the improved battery for use in situations where a high current is needed to perform work and where a high current is available for recharging the battery.

In addition, with this invention it is not necessary for current generated near the bottom of every plate to travel up through a plate to reach the intercellular current path through the straps connecting the cells. Providing current paths through the cells at the bottom of the plates decreases the current flow in the upper and middle parts of each plate and increases the ability of the plates themselves to produce and carry heavy currents.

Furthermore, by providing a number of current paths so that the distance travelled by current generated in the bottom portion of the plate is considerably reduced, the resistance of the average current path and, hence, the internal battery power losses are considerably reduced. This, of course, frees a portion of the stored energy, which was fromerly lost within the battery, for useful external work.

One method of constructing this improved battery is to pour molten electrical conducting material, for example, lead at about 500° F., into troughs or channels formed on or in the floor of the battery case. Openings at selected locations through or under the partitions separating the cells permit the molten metal on each side of the openings to flow together, and to thereby join the cells in the same manner as the straps across the top of the battery. The plates are then set into the molten material which hardens and anchors the plates firmly to the battery floor.

This method results in the plates being firmly fixed to the battery case, improving resistance to vibration and rough handling. Batteries constructed by this method can even be operated in an inverted state such as occurs from time to time in the flight of an airplane. Also, this method is a simple and inexpensive way of assembling a reliable, economic, and superior battery.

Yet another method of multiple intercellular interconnection can be accomplished by attaching bars, which interconnect only the plates of the same polarity in each cell, to the legs of all the plates. Further conductive members are then associated with the partitions so that, when the plates are set in each cell, these members electrically contact the correct bars to serially link the cells. These contacts can be made permanent by resistively or otherwise welding the members to the bars.

The improved battery characteristics which are the direct result of this invention especially suit this improved battery as the source of power for a practical electric car. The costliness of and pollution from conventional gasoline engine automobiles has renewed interest in electric cars which can be operated inexpensively from lead-acid storage batteries. The increased ability of this improved battery to withstand high currents decreases the time for recharging of the batteries and increases the current which can be supplied during operation. The increased ruggedness of the battery, which improves the overall reliability and increases the expected lifetime of the battery, also increases the reliability and decreases the economic costs of an electric vehicle powered by this improved battery. This improved type of battery can power a practical electric car for considerable distances, inexpensively and with short recharging times.

BRIEF DESCRIPTION OF THE DRAWINGS

FIG. 5 is a view disclosing an alternate arrangement for the added intercellular connections.

DETAILED DESCRIPTION OF THE DRAWINGS

Lead-acid direct current storage batteries have been in use for many years and have proved a satisfactory source of direct current voltage for many diverse uses. Many of these batteries are composed of a number of distinct cells which are, in turn, composed of an equal number of paired positive and negative battery plates immersed in an electrolyte solution. The most common arrangement in these batteries utilizes positive plates of lead peroxide and negative plates of spongy lead immersed in a bath of sulfuric acid. In the discharging operation, during which the battery supplies direct current to a load, both the positive and negative plates react with the sulfuric acid to form lead sulfate. Water is then formed at the positive plates, diluting the sulfuric acid, and the resulting migration of electrons to the negative plates causes a direct current voltage to appear across each pair of plates. In each cell, all of the pairs of plates, each of which acts as a miniature battery, are connected in parallel so that the voltage across the cell is substantially the same as the voltage across any pair of plates within that cell. All of the cells in the battery are then connected serially, so that the voltage across the entire battery is the arithmetical sum of the voltages across each of the cells. In the charging operation, during which the battery is supplied with direct current, the plates are chemically reconverted to their original material and the water in the electrolyte solution is changed back into sulfuric acid. Thus, the battery can be cycled alternately through a large number of charging and recharging operations, alternately storing and expending energy, and available as a self-contained power source between recharging operations.

Figure 1:
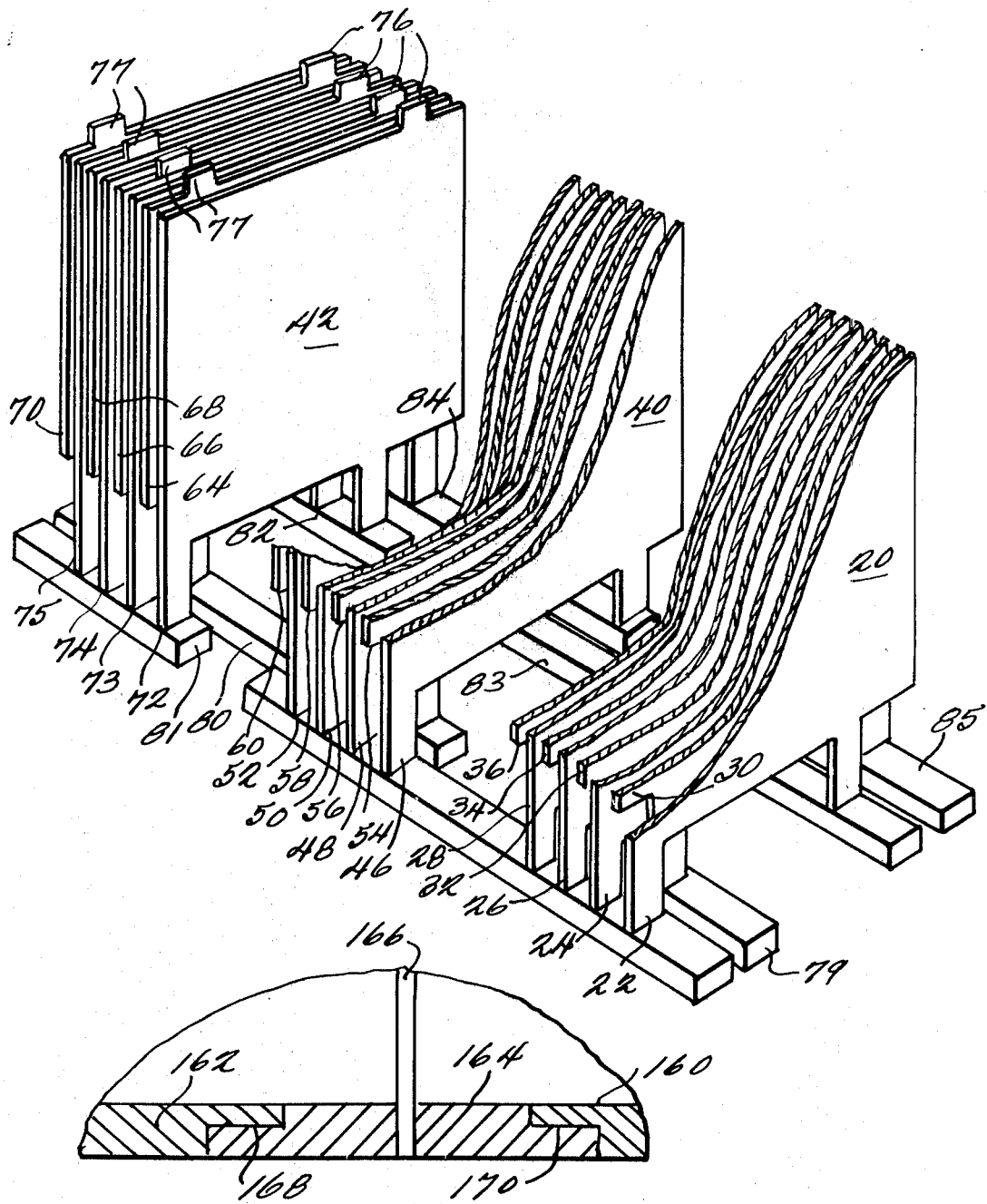
FIG. 1 is a view of a three-cell storage battery with the case and intercellular partitions removed to display the added intercellular connections.

In FIG. 1, a typical battery of this type is illustrated with the case and the partitions between each of the three cells removed so that added intercellular connections can be clearly seen. Each of the three cells is illustrated as being comprised of four pairs of positive and negative plates. Most storage batteries contain many more pairs of plates, but the number has been deliberately reduced to four in order to illustrate the invention with maximum clarity. The number of pairs of positive and negative plates can, of course, be varied according to the battery capabilities and characteristics desired, but this invention can be practiced with any number of pairs. In the first group of plates which comprise the cell 20, the positive plates 22, 24, 26 and 28 are paired respectively with the negative plates 30, 32, 34 and 36. The other two battery cells 40 and 42 are similarly illustrated as being comprised of four pairs of positive and negative plates, negative plates 46, 48, 50 and 52 and positive plates 54, 56, 58 and 60 in cell 40 and negative plates 64, 66, 68 and 70 and positive plates 72, 73, 74 and 75 in cell 42. A portion of each of the plates in cells 40 and 42 has also been removed so as to better illustrate the intercellular connections. Although it is not necessary to practice this invention, all the positive plates are assumed to be identical as are all the negative plates.

Each of the plates, which are illustrated in FIG. 1, both positive and negative, has two separated extensions or legs on which it is supported above the battery floor. Also, each plate has been constructed with a tab 76 or 77 on the top side, opposite the legs, whose purpose is to facilitate connection of all the positive plates in each cell together and all the negative plates in each cell together in the conventional fashion. When the plates are arranged properly with alternate positive and negative plates, the tabs 76 of all the positive plates will line up on one side of each cell and the tabs 77 of the negative plates on the other. All of the positive tabs in each cell can then be linked with a metal bar, and then all the negative tabs linked with another bar. In two of the cells, usually the cells disposed at the ends of the battery, two of the bars are fixed respectively to the positive and negative external terminals. Each of the remaining bars is connected to a neighboring bar by means of a metal strap which usually passes over each partition separating adjacent cells or straddles a scalloped section removed from the top of each partition to serially connect the cells.

The use of legs on the battery plates to support the plates is more fully disclosed in Reed Pat. No. 2,511,943. The Reed improvement relates to means for electrically connecting all the plates of the same polarity in each cell by connecting the legs of the positive and negative plates in each cell and disposing these connections, which are ordinarily metal bars, in open chambers formed between narrow ribs extending upward from the battery floor. Since each of the two legs on each plate is connected to a different bar, all the plates of the same polarity in each cell are connected in two locations near the bottom of the battery and one near the top. These connections, hence, interconnect all the plates of the same polarity in each cell in a number of locations so that, should one plate become disconnected from all but one of the connections, current could still flow in or out of that plate through that connection. Furthermore, the ribs of Reed which separate the chambers in which the connections are disposed ensure that any oxidized material which falls from any of the plates will not short-circuit a pair of plates by building up a conductive path between the plates on the floor of the battery.

This invention proposes not only to connect all the plates of the same polarity in each cell, but to interconnect the cells themselves in a plurality of separated locations. In the embodiment shown in the figures, the connections which serve to connect all the plates of the same polarity in each cell together are themselves connected together through the cell partitions in a plurality of locations. The particular arrangement of two cell connections between each two adjacent cells through openings in the intercellular partition near the bottom of the battery in addition to the connection near the top, has proved particularly practical and useful.

In batteries of the prior art, current which was generated near the bottom of a plate had to migrate all the way to the top of the plate in order to flow between the cells. Current density was not uniform throughout the plate and the maximum current capacity of each plate was determined by the current capacity in the area of maximum or critical current density in that plate. By connecting the cells at the bottom of the battery, current which is generated near the bottom of each plate can travel down through one or the other of the legs to the connecting bars and then to the adjacent cell, resulting in a more uniform current density.

Further, because of the method of manufacture, most plates are weak in the region around the center of the plate. This weakness severely limits the current-carrying ability of the plate. By providing an exit and entrance for current near the bottom of the plate, current in this weak mid-region is reduced considerably, reducing thereby the possibility of battery failure. Current in this region can even be reduced almost to zero by properly designing the plate dimensions and choosing proper materials and thicknesses for the intercellular connections.

Figure 3:
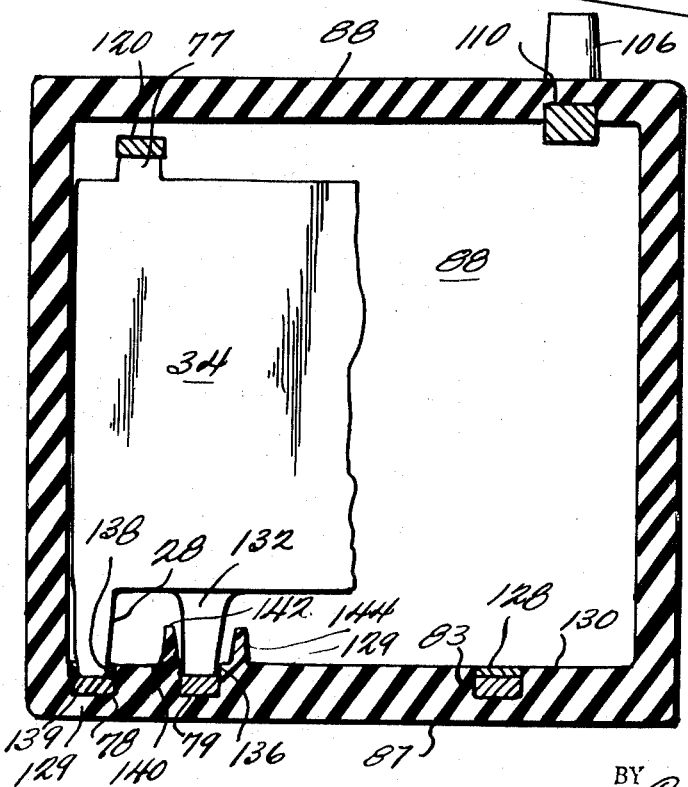
FIG. 3 is a sectional view of FIG. 2 along the line 3-3'.

Furthermore, the extra intercellular connections considerably reduce the length of the average current path through the battery, thereby decreasing the average resistance encountered by the current. This resistance can be even further reduced by connecting the adjacent cells, as illustrated in FIG. 3, with a bar through yet another opening in the intercellular partition near the top of the battery in place of the conventional strap. Reducing the average resistance, of course, reduces the amount of stored energy which is uselessly dissipated within the battery and increases the amount of stored energy available for useful work. In addition, the production of heat within the battery itself is considerably reduced, with a commensurate reduction in problems accompanying that heat production.

Each of the pairs of positive and negative plates shown in FIG. 1 is in reality a miniature battery, and each cell consists of a number of these miniature batteries connected in parallel. Similarly, a conventional storage battery is comprised of a number of serially connected cells. In FIG. 1 the positive plates 22, 24, 26 and 28 of cell 20 are connected by a bar 78 to the negative cells 46, 48, 50 and 52 of cell 40. The partition which would ordinarily separate cell 20 from cell 40 has been removed so that the intercellular connections can be shown with maximum clarity. This partition, shown in FIG. 3, has an opening near the bottom of the battery through which bar 78 passes. Thus, the same connection which serves to link all the positive plates in cell 20 also serves to link all the negative plates in cell 40 and to connect the two cells serially, duplicating the strap connection. The bar 78 thereby effects both the serial intercellular connection and half of the parallel intracellular connection. The bars 79 and 85 connect the negative plates 30, 32, 34 and 36 in cell 20 and completes the intracellular parallel connection. Similarly, positive plates 54, 56, 58 and 60 of cell 40 are connected to negative plates 64, 66, 68 and 70 of cell 42 and the cells 40 and 42 interconnected by a bar 80. Bars 81 and 82 serve to connect positive plates 72, 73, 74 and 75 and again to provide one-half of the parallel intracellular connection within cell 42. The bar 83 interconnects cells 20 and 40 and the positive and negative plates respectively of those two cells, duplicating the connection of bar 78. Similarly, bar 84 duplicates the connection of bar 80. These multiple connections guard against failure of a single bar and also further reduce the battery resistance and internal energy losses.

These intercellular connections along the floor of the battery may also serve to anchor the plates firmly to the battery floor, increasing resistance to vibration and rough handling, and even permitting inverted operation of the battery such as might occur during the flight of an airplane. The bars 78, 79, 80, 81, 82, 83, 84 and 85 may be lodged securely and wholly within troughs cut in the battery floor so that the ends of the legs of the plates rest flush or below the level of the battery floor, as shown in FIG. 3. These bars may also rest directly on the floor, thereby elevating the ends of the battery legs a short distance above the floor.

Figure 2:
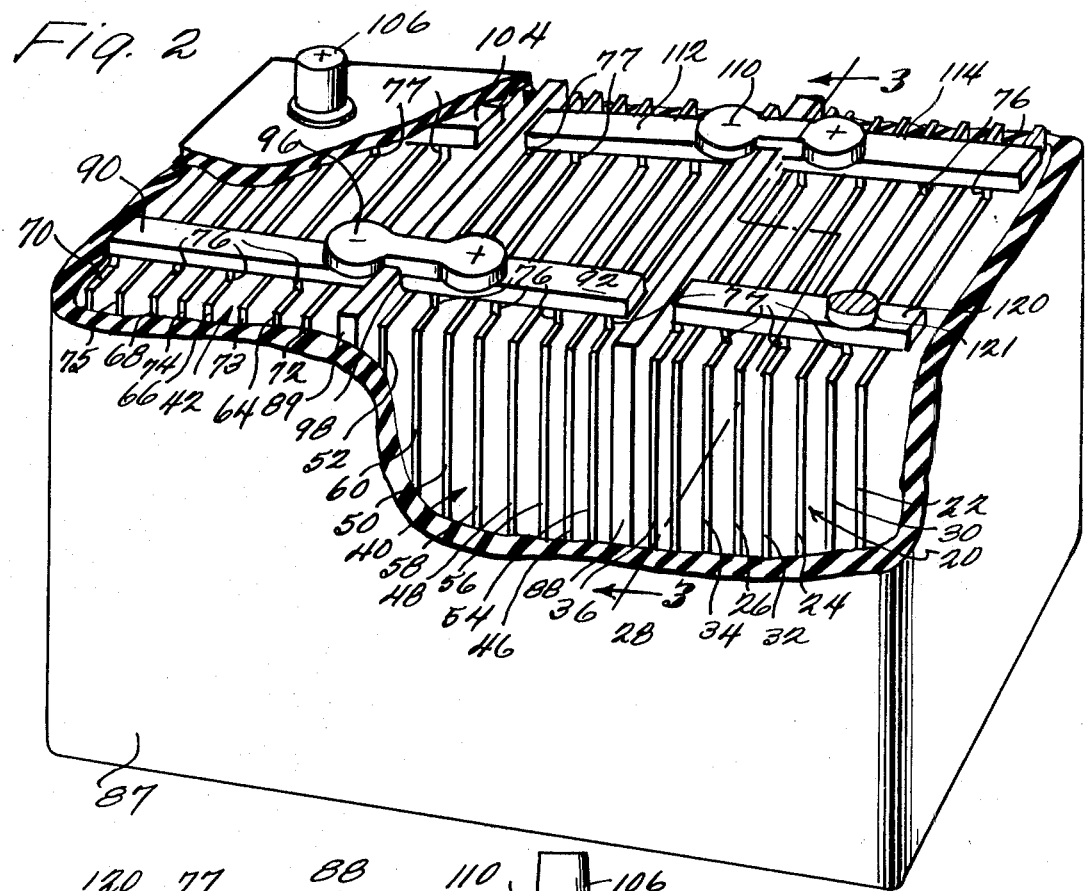
FIG. 2 is a view of the battery of FIG. 1 with part of the case removed to show the intercellular connections at the top of the battery.

Referring to FIG. 2, the battery is shown with the top portion of the battery case 87 removed so that the partitions and upper connections are visible. The battery case 87 itself may be constructed of fiber glass, hard rubber, or any material which meets the necessary requirements of limited weight and ability to withstand rough treatment. If the ribs described above and in the Reed patent are included, they ordinarily are formed as an integral part of the battery floor.

A partition, which must be adequate to prevent the electrolytes in adjacent cells from intermixing separates adjacent cells. Any suitable material may be used to construct the partition, although the same material is usually used as is used in the battery case, and the partition is usually formed integrally with the case. As shown in FIG. 3, these partitions may have openings through or under them at predetermined locations for the purpose of allowing connections such as bars 78, 80, 83 and 84 to pass through or under and to thereby interconnect adjacent cells. In FIG. 2, a partition 88 is illustrated separating cells 20 and 40 and a partition 89 separating cells 40 and 42.

A bar 90 contacts all the extending tabs 77 and interconnects all of the negative plates 64, 66, 68 and 70 in cell 42. Similarly, a bar 92 connects all the tabs 76 of the positive plates 54, 56, 58 and 60 in the cell 40. A strap 96 straddles a scalloped section 98 cut out of the partition 89 and serves to link the bars 90 and 92, and thereby to electrically interconnect the cells in the same manner as the bottom bars 80 and 84. Another bar 104 connects all the positive plates 72, 73, 74 and 75 in cell 42 to the positive external terminal 106. In cell 20, a strap 110 connects bar 112 linking negative plates 46, 48, 50 and 52 of cell 40 to bar 114 connecting positive plates 20, 22, 24 and 26 of cell 20, over the scalloped section 116 of partition 88, duplicating the intercellular connections made by bars 78 and 83. The bar 120 operates similarly to connect all the negative plates 30, 32, 34 and 36 in cell 20 to the external negative terminal 121.

The upper connection, in this embodiment, straps 96 and 110, need not be entirely or even partially external to the cell. An opening cut near the top of each partition can be used to interconnect the cells by permitting the passing of a metal bar through the partition in the same manner as the openings near the bottom. This connection, shown in FIG. 4, considerably shortens the length of the average current path through the battery.

FIG. 3 depicts a section of the battery of FIG. 2 along the line 3—3. The bar 83, which is shown in FIG. 1, serves to link cells 20 and 40, and is illustrated as passing through an opening 128 cut through the partition 88 near the bottom of the partition. In this embodiment, the opening is cut below the level of the battery floor 129 of the case 87 and simply connects two troughs or channels cut in the battery floor 129, within which the bar 83 is lodged. If the bar 83 is to rest upon the battery floor or above it, the position of the opening 128 can be correspondingly adjusted to permit passage of the bar through the partition. A sealing element 130 is further disposed about the opening 128 to prevent any intermixing of the electrolyte solutions in cells 20 and 40. The bar 83 and the strap 110 connect the cells 20 and 40 in the same serial manner and interconnect to the same plates. Along with bar 78, these intercellular connections serve to increase reliability and lifetime and to enhance the current carrying ability of the battery.

Also, FIG. 3 illustrates the left half of a typical negative plate 34. The tab 77 is attached to the bar 120 which serves to link all the negative plates in cell 20. One leg 132 (not shown in FIG. 1) of the plate 34 is fastened to the bar 79 which then links all the negative plates in cell 20 in the same manner as bar 120. The bar 79 is disposed within a trough or channel 136 carved in the bottom of the battery floor 129 so that the end of the leg 132 is substantially below the level of the battery floor 129.

A leg of the positive plate 28 is shown attached to the bar 78, which is lodged within the adjoining trough or channel 138. The bar 78 similarly links all the positive plates in cell 20 and extends through an opening 139 in the partition 88 in the same manner as bar 83 to interconnect cells 20 and 40. A sealing element 140 also seals opening 139.

All of the positive and negative plates are designed so that even when the legs of the plates are disposed within troughs or channels such as 128, 136 and 138, the body of the plates will be situated considerably above the top of the ribs 142 and 144 so that the ribs and plates cannot wear into each other. The ribs 142 and 144 further prevent settling conductive material from building a conductive layer on the battery floor 129 and creating a short circuit between adjacent bars such as 78 and 79. Other ribs (not shown) separate each set of adjacent bars in the bottom of the battery from each other and thus considerably prolong battery life.

Figure 4:
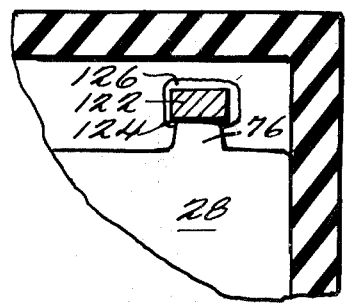
FIG. 4 depicts a modification of FIG. 3 wherein the upper connection comprises a bar which passes through an opening in the partition.

FIG. 4 depicts a modification of FIG. 3 wherein the upper connection comprises a bar which passes through an opening in the partition to link adjacent cells. The bar 122 interconnects cells 20 and 40 through an opening 124 in the partition 88 and replaces the bars 112 and 114 and the strap 110 shown in FIG. 2. The positive plate 28 is connected to the bar 122 by a tab 76, and the bar 122 links all the positive plates in cell 20, as well as all the negative plates in cell 40. A sealing element 126 is disposed about the opening 124 to prevent intermixing of electrolytes in the two adjacent cells 20 and 40.

The intercellular connections along the battery floor 129 may be formed in a variety of ways. For example, to form an embodiment as shown in FIG. 3, molten lead at approximately 500° F. can be poured into all the open troughs, including troughs 128, 136 and 138, to form lead bars so that bars in adjacent cells which share a common opening in the partition separating the cells are joined by the liquid movement of the lead into that opening. The plates can then be set into the molten lead before it has hardened, so that, after the lead has cooled, the plates will be firmly attached to the cooled lead bars and thereby to the battery floor 129 as shown in FIG. 3.

Another method of interconnecting the cells is by attaching bars just to the plates for each cell so all the negative plates in each cell and all the positive plates in each cell are electrically joined only to plates within that cell and then to associate further connective elements with each partition so that, when the plates with the bars properly attached are inserted in the case, the further connective elements will contact the bars to effect proper and multiple intercellular connections.

This arrangement is shown in FIG. 5, where two of the adjacent bars 160 and 162, which in FIGS. 1, 2 and 3 would have been joined through an opening, are instead illustrated as being both in contact with an extending member 164 which itself provides an electrical path through the partition 166. The bars 160 and 162 are then permanently connected to the member 164 by heating their points of contact 168 and 170 with member 164 until a proper weld is established. This heating might be caused, for example, by applying a source of potential across the points of contact and allowing the current flowing through the points to resistively heat and melt the surrounding metal.

It should be understood that these embodiments discussed herein are merely examples of the invention. Many modifications and additions can be made without departing from the spirit of the invention, and we intend to be bound only by the scope of the appended claims.

What is claimed is:
1. A storage battery comprising:
  a case,
  a plurality of cells within said case,
  a plurality of voltage producing elements within said cells,
  first connecting means within said case for serially connecting said cells near the bottom of said battery so that each cell is electrically connected to another cell and so that the voltage across all the cells is the sum of the individual cell voltages, and
  second connecting means for serially connecting said cells so that each cell is electrically connected to another cell near the top of said battery in the same manner as connected by said first connecting means and so that the voltage across said cells is the sum of the individual cell voltages.

2. A storage battery as in claim 1 including a plurality of partitions separating said cells, said first connecting means extending through openings in said partitions to connect said cells.

3. A storage battery as in claim 2 wherein said elements are pairs of positive and negative plates for immersion in an electrolyte solution.

4. A storage battery as in claim 3 including a plurality of sealing elements disposed about said openings to prevent said solution from passing through said openings.

5. A storage battery as in claim 3 wherein said first connecting means comprises a plurality of metal bars which connect all the plates of the same polarity in each cell, some of said bars extending through said openings to connect said cells.

6. A storage battery as in claim 5 wherein said plates each have a plurality of downwardly extending legs which attach to said bars.

7. A storage battery as in claim 6 including a plurality of ribs extending upwardly from the floor of said case to separate said bars.

8. A storage battery as in claim 3 wherein said first connecting means comprises a plurality of bars connecting all the plates of the same polarity in each cell and a plurality of extending members, associated with said partitions, contacting the proper bars to connect said cells.

9. A storage battery as in calim 7 wherein each two adjacent cells are connected by two said bars passing through said two said openings near the bottom of said battery.

10. A storage battery as in claim 9 wherein said bars are disposed within troughs in the floor of said case.

11. A storage battery as in claim 10 wherein said second connecting means includes a plurality of second bars connecting all the plates of the same polarity in each cell and a plurality of straps connecting said second bars.

12. A storage battery as in claim 11 wherein said straps pass through openings near the top of said partitions and including sealing means disposed about said openings to prevent said solution from passing through said openings.

13. A storage battery comprising:
  a case,
  a plurality of cells within said case,
  a plurality of positive and negative plates for immersion in an electrolyte solution within each said cell, each said plate having two downwardly extending separated legs,
  four bars in each cell near the bottom of said battery, said legs being attached to said bars so that all the plates of the same polarity in each cell are connected by two separated bars,
  a plurality of partitions separating adjacent cells, each partition having two openings near the bottom of said battery through which two of said bars in each adjacent cell are connected so as to serially connect the cells, a plurality of ribs extending upwardly from the floor of said case in each cell to separate the said four bars in each cell, a plurality of sealing elements disposed about said openings to prevent said solution in adjacent cells from intermixing, and connecting means near the top of said battery connecting all the plates of the same polarity in each cell and serially connecting said cells in the same manner as said bars.

References Cited

UNITED STATES PATENTS

| | | | |
|---|---|---|---|
| 2,511,943 | 6/1950 | Reed | 136—134 |
| 3,072,984 | 1/1963 | Bronstert | 136—134 |
| 3,261,719 | 7/1966 | Shannon | 136—134 |
| 3,309,232 | 3/1967 | Wilson | 136—134 |
| 3,313,658 | 4/1967 | Sabatino et al. | 136—134 |

WINSTON A. DOUGLAS, Primary Examiner

C. F. LE FEVOUR, Assistant Examiner

U.S. Cl. X.R.

136—79